Dec. 21, 1965 C. M. ORR 3,224,620
GAS TIGHT SEAL
Filed Feb. 26, 1963 3 Sheets-Sheet 1
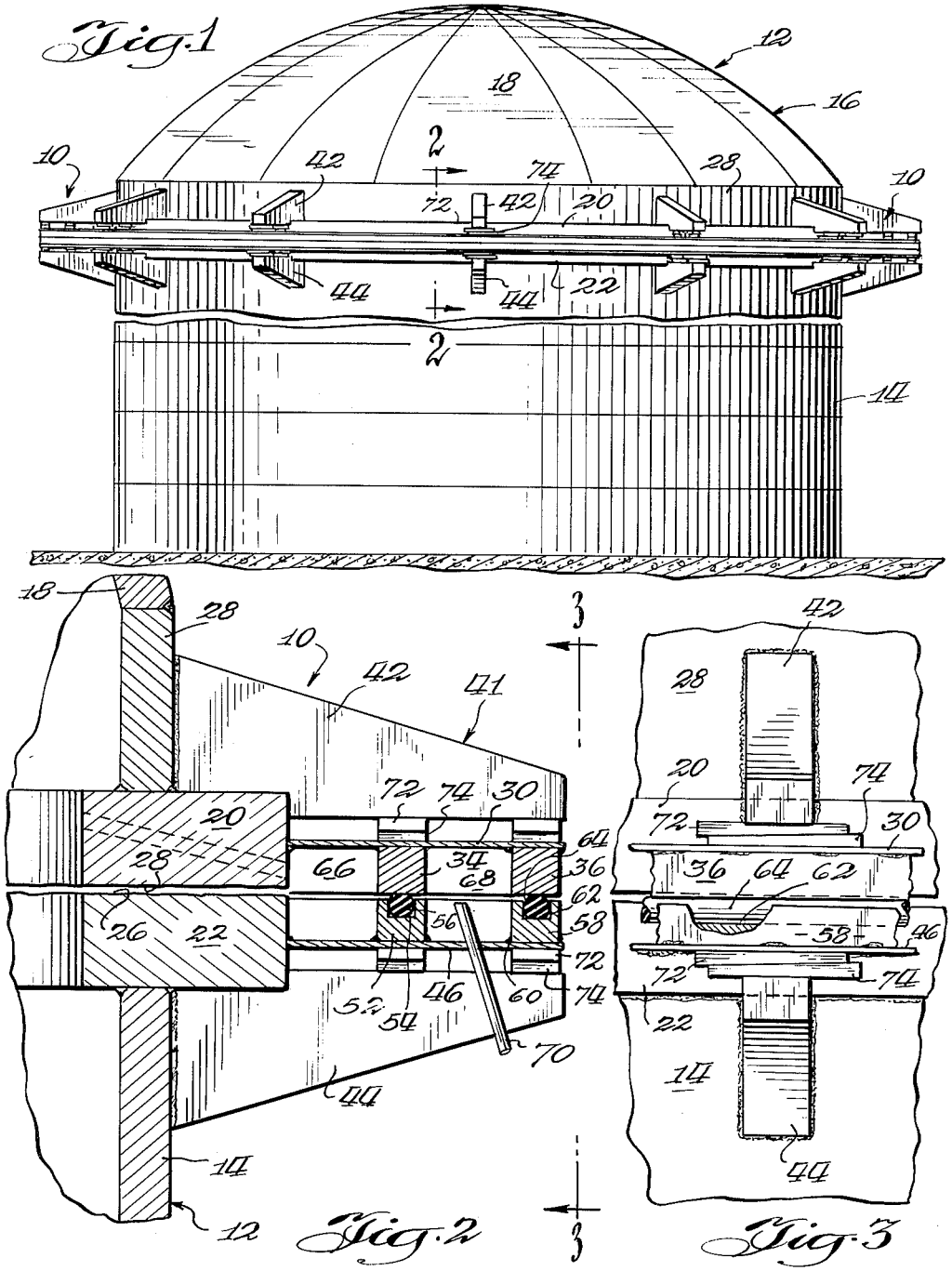
Inventor
Clifford M. Orr
By Merriam, Smith & Marshall
Attorneys

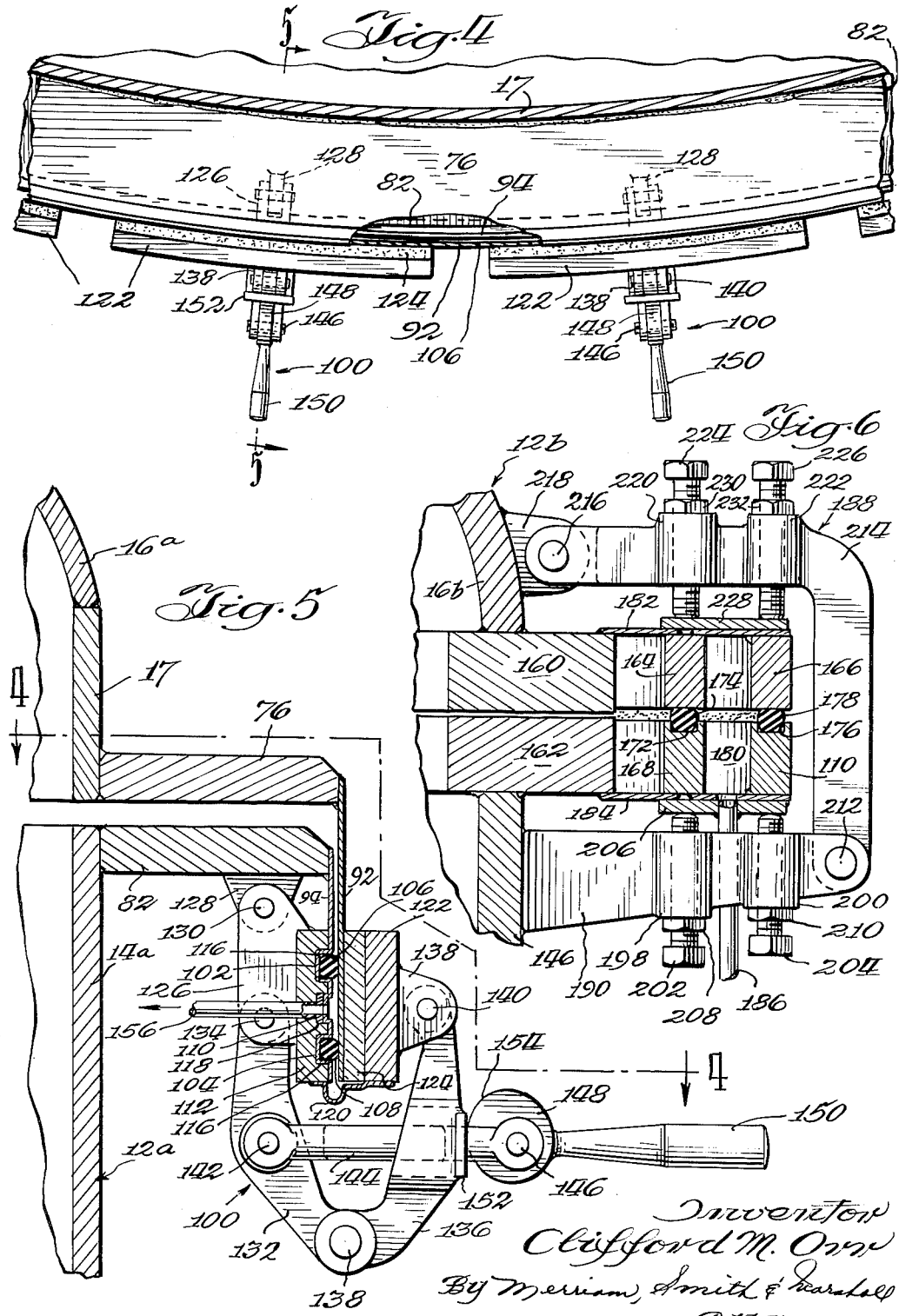

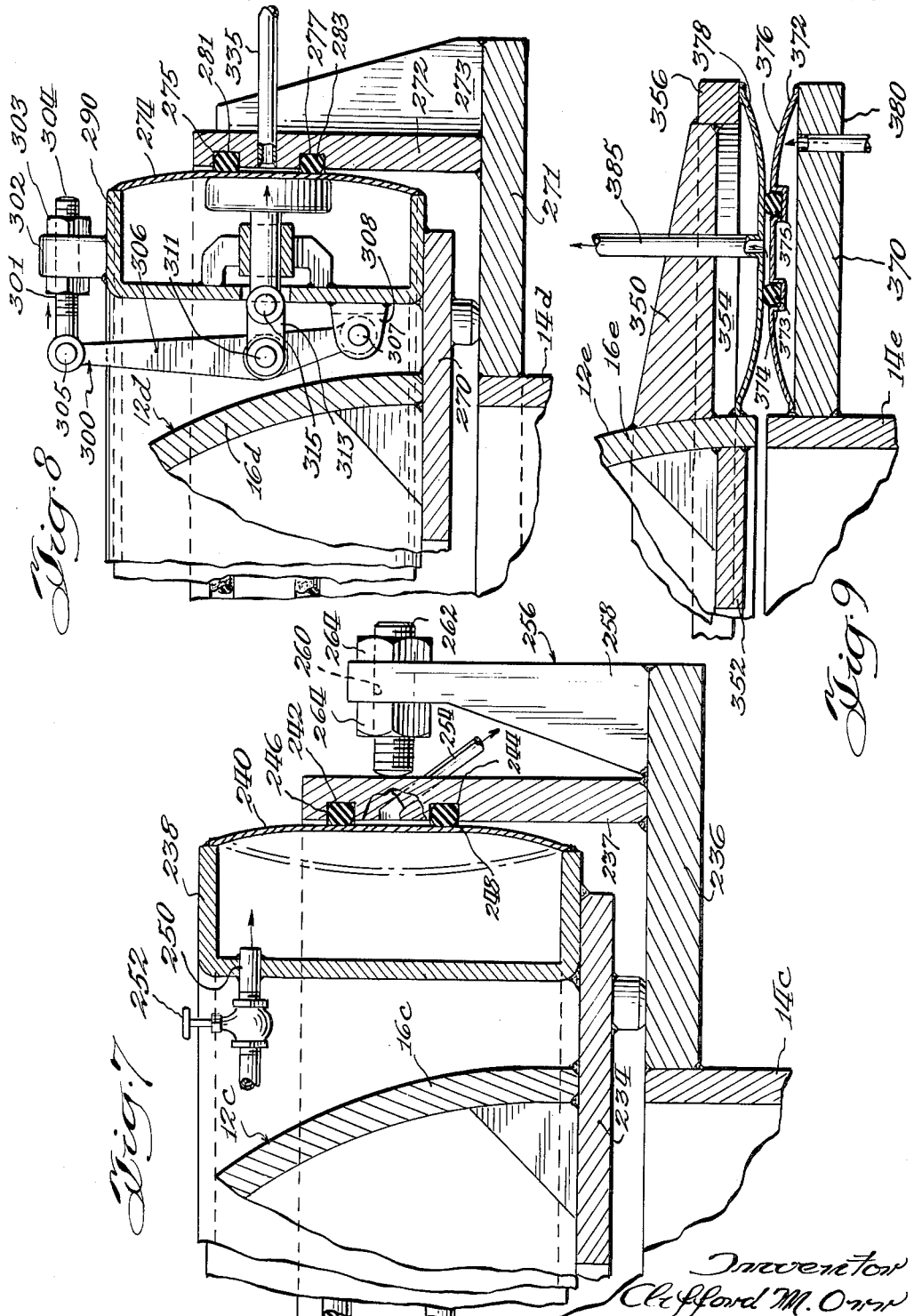

United States Patent Office 3,224,620
Patented Dec. 21, 1965

3,224,620
GAS TIGHT SEAL
Clifford M. Orr, Western Springs, Ill., assignor to Chicago Bridge & Iron Company, Oak Brook, Ill., a corporation of Illinois
Filed Feb. 26, 1963, Ser. No. 261,073
1 Claim. (Cl. 220—5)

This invention relates generally to seals for pressure vessels and more particularly to an independent seal apparatus for the structural jonts of a pressure vessel such as a high vacuum tank.

Heretofore, difficulty was experienced in forming effective seals for pressure vessels such as high vacuum containers and the like because of the necessity for accurate fitting of the sealing surfaces in the field. This fitting often requires machining of the surfaces and hand grinding. According to an important aspect of the present invention, the need for accurate fitting of the confronting surfaces of flange joints is obviated by the provision of an independent seal arrangement which may be secured to the structural elements of the vessel.

The present invention finds wide application in structures composed of confronting members by sealing the space or seam between the members. Generally a flexible element grooved for the reception of a resilient gas impervious means such as an O-ring or gasket is connected to one of the members while a facing element having means for engaging the resilient gas impervious means is connected to the other member. These flexible elements and resilient gas impervious means extend continuously along the entire length of the seam and are urged together by one or more force exerting means.

In the drawings:

FIGURE 1 is an elevational view of a tank equipped with seal assemblies made in accordance with the present invention;

FIGURE 2 is a greatly enlarged sectional view taken substantially on line 2—2 of FIGURE 1;

FIGURE 3 is a view taken substantially on line 3—3 of FIGURE 2;

FIGURE 4 is a reduced view taken substantially on line 4—4 of FIGURE 5 and shows a modified form of the present invention;

FIGURE 5 is an enlarged view taken substantially on line 5—5 of FIGURE 4;

FIGURE 6 is a fragmentary sectional view of a further modified form of the present invention;

FIGURE 7 is a fragmentary sectional view of another modified form of the present invention;

FIGURE 8 is a fragmentary sectional view of still another modified form of the present invention; and FIGURE 9 is a fragmentary sectional view of another modified form of the present invention.

Referring now to the drawings and more particularly to FIGURE 1, the independent seal apparatus of the present invention is indicated generally by reference numeral 10 and is shown in operative relationship to a tank 12, which may be of the high vacuum type, having a top section 16, consisting of a dome 18 and an annular flange 20, and a body section 14 provided at its upper edge with an annular flange 22.

According to the present invention, the independent seal apparatus 10 is capable of efficiently and effectively sealing the joint between the annular flange 20 and the annular flange 22 without the need for accurate fitting of the confronting faces of these flanges.

In FIGURE 2 is shown the flange 20 in operative relation to the flange 22 and having an annular face 26 in confronting relation to an annular face 28. The independent seal apparatus 10 includes a continuous annular flexible plate 30 secured to the flange 20 and a pair of radially spaced depending rings 34 and 36 secured to the under face of the plate 30. The seal apparatus 10 has a plurality of circumferentially spaced seal assemblies 41. Each assembly 41 has a bracket 42 which is secured, as by welding to the surface of the dome 18 and the flange 20. In like manner, a plurality of brackets 44 are secured, as by welding or the like, to the upper marginal edges of the exterior surface of the body section 14 and to the flange 22, in register or vertical alignment with the brackets 42.

A continuous annular flexible plate or diaphragm 46, of stainless steel or the like, is secured at its inner marginal edge to the flange 22. Affixed to the upper surface of the plate 46, as viewed in FIGURE 2 is a ring 52 having formed in the upper surface thereof a continuous annular groove 54 in which is received an O-ring 56. The ring 52 is arranged in register with the ring 34 so that the O-ring 56 cooperates with the ring 34 to form a gas tight seal. An annular ring 58 is secured to the upper surface of the plate 46, as by gas tight welding or the like, in radial spaced relation to the ring 52 and in vertical registration with the ring 36. Formed in the upper surface of the ring 58 is a continuous annular groove 62 in which is disposed an O-ring 64 which cooperates with the ring 36 to form an additional gas tight seal. It will be noted that the rings 34, 36, 52 and 58 divide the space between the plates 30 and 46 into a pair of radially spaced chambers 66 and 68. The chamber 66 is in fluid communication with the interior of the pressure vessel 12. The chamber 68 may be evacuated, if desired, through tube 70.

Intimate contact between the O-rings 56 and 64 and the rings 34 and 36, respectively, is effected by means of pairs of wedges 72 and 74 (see FIGURE 3). By this arrangement, the admission of air into the interior of the vessel 12 is effectively precluded.

In FIGURES 4 and 5 is shown a modified form of the present invention in which a tank 12a has a dome 16a, having a depending flange 17, and a body section 14a. Extending radially outward from the lower edge of the flange 17 is an annular flange 76 whose inner periphery is secured to the outer periphery of the flange 17 adjacent its lower marginal edge. Similarly, an annular flange 82 extends radially outwardly from the wall of the body section 14a and its inner periphery is secured to the outer periphery of the body section 14a adjacent to its upper marginal edge. It will be noted that the flange 82 extends radially to a lesser extent than the flange 76. Depending from the flange 76 and secured thereto is a continuous flexible strip 92. In like manner, a flexible strip 94 depends from the outer edge of the flange 82.

According to the present invention and referring particularly to FIGURE 5, a plurality of seal assemblies 100 are circumferentially disposed about the vessel to effect efficient sealing of the flexilbe strips 92 and 94. To this end, the strip 94 is formed with a pair of continuous inwardly extending spaced detents 102 and 104 in which are received resilient O-rings 106 and 108, respectively. Between the detents 102 and 104 is formed a detent 110 for a purpose hereafter described.

Each seal assembly 100 includes an arcuate block 112 having a pair of spaced arcuate slots 114 and 116 in which are received the projecting portions of the strip 94 forming the recesses 102 and 104. In addition, the block 112 is formed with an arcuate slot 118 in which is received the projecting portion of the strip 94 forming the recess 110. Connected to the block 112 by means of springable hinge 120 is a block 122, of generally arcuate configuration. Secured to one face of the block 122 is a resilient shoe 124.

The strip 92 is urged into firm engagement with the O-rings 106 and 108 by means of the seal assemblies 100. In the form of the invention shown in FIGURE 5, the block 112 is affixed to a bracket 126 which is pivotally mounted on a lug 128 by means of pin 130. A link 132 is mounted for pivotal movement with respect to the bracket 126 by means of pin 134. The link 132 is pivotally connected to a link 136 by means of pin 138 and the other end of the link 136 is pivotally connected to a lug 138 by means of pin 140. The lug 138 is secured to the block 122.

Mounted for pivotal movement with respect to the link 132, by means of pin 142, is a rod 144 which is pivotally connected, by means of a pin 146, to a cam 148 having a handle 150. The link 136 is formed with a cam plate 152. As the handle 150 is moved in a counterclockwise direction, as viewed in FIGURE 5, a cam lobe 154 is brought into engagement with the cam plate 152 and the blocks 112 and 122 are firmly urged each towards the other with the result that the O-rings 106 and 108 are compressed thus forming an effective seal. If desired, the space betwen the O-rings 106 and 108 may be evacuated by means of conduit 156. Each seal assembly 100 may be released by moving the handle 150 oppositely, as will be understood.

In FIGURE 6 is shown a further modified form of the present invention in which tank 12b has a dome 16b formed with an outwardly projecting annular flange 160 and a body section 14b formed with an outwardly projecting annular flange 162. The confronting faces of the flanges 160 and 162 need not be machined. Disposed radially outwardly from the outer periphery of the flange 160 are a pair of spaced rings 164 and 166. In like manner, a pair of spaced rings 168 and 170 are arranged radially outwardly of the outer periphery of the flange 162. The upper surface of the ring 168 is formed with a recess 172 for the reception of an O-ring 174 and the upper surface of the ring 170 is formed with a recess 176 for reception of an O-ring 178. It will be noted that the O-rings 174 and 178 are arranged in abutment with the lower surfaces of the rings 164 and 166, respectively. Extending across the top surfaces of the rings 164 and 166 and covering the outer marginal edge of the upper surface of the flange 160 is a continuous flexible metal plate 182 of generally annular configuration. Similarly, a continuous, flexible metallic plate 184, also of annular configuration, extends across the bottom surfaces of the rings 168 and 170 and covers the outer marginal edge of the lower surface of the flange 162. By this arrangement, a chamber 180 is formed between the pairs of rings 164 and 166 and the pairs of rings 168 and 170. The chamber 180 may be evacuated by means of a conduit 186.

According to the present invention, the plates 182 and 184 are urged into firm engagement with their associated rings by means of a plurality of circumferentially spaced clamp assemblies 188, each of which includes a fixed bracket 190 secured to the outer surface of the body section 14b. Each of the brackets 190 includes integrally formed threaded bosses 198 and 200 in which are received cap screws 202 and 204, respectively. The free ends of the cap screws 202 and 204 are arranged in abutment with a continuous ring 206 disposed in abutment with the lower surface of the plate 184. By this arrangement, the clamping force exerted by the screws 202 and 204 is distributed evenly throughout the length of the plate 184. To maintain the screw 202 in a predetermined position, a lock nut 208 is provided and lock nut 210 is provided for the cap screw 204.

Connected to the outer end of the bracket 190 by means of pin 212 is an L-shaped bracket 214 whose opposite end is connected by means of pin 216 to a lug 218 affixed to the dome 16b. The bracket 214 has a pair of spaced integrally formed threaded bosses 220 and 222 in which are threadedly received cap screws 224 and 226, respectively. The lower ends of the cap screws 24 and 226, as viewed in FIGURE 6, are disposed against a continuous annular strip 228. Lock nuts 230 and 232 are provided for the screws 224 and 226, respectively. In this form of the invention, the transmission of air into the interior of the vessel 12b is effectively precluded because of the gas tight security provided by the plates 182 and 184 arranged in the manner illustrated.

In FIGURE 7 is illustrated a further modified form of the present invention in which tank 12c has a dome 16c provided with an annular flange 234, part of which extends radially inwardly to form an interior support and part of which extends radially outwardly. A body section 14c is provided with a radially outwardly extending annular flange 236 on which is mounted an upstanding continuous ring of metal 237 having some degree of flexibility. Mounted on the outer end of the flange 234 is an annular manifold 238, of substantially U-shaped configuration. A continuous flexible metal diaphragm 240 completes the enclosure of the manifold 238. The interior surface of the ring 237 is formed with a pair of spaced recesses 242 and 244 for reception of O-rings 246 and 248, respectively. Fluid under pressure may be introduced into the manifold 238 by means of an inlet port 250 and controlled by means of a valve 252. This fluid, which may be a compressed gas such as air or the like, urges the diaphragm 240 into sealing engagement with the O-rings 246 and 248. The space between the O-rings 246 and 248 may be evacuated if desired by means of conduit 254.

Mounted on the flange 236 are a plurality of circumferentially spaced clamp assemblies 256. Each of the assemblies 256 includes an upstanding standard 258 having at its upper end a threaded opening 260 for reception of a screw 262, the left end of which, as viewed in FIGURE 7, is disposed in abutment with the ring 237 to assure firm engagement of the diaphragm 240 with the O-rings 246 and 248. Two lock nuts 264 are provided to maintain the screw 262 in a predetermined position.

Shown in FIGURE 8 is a further modified form of the present invention in which the tank 12d has a dome 16d provided with an annular flange 270, part of which extends radially inward to form an interior support and part of which extends radially outward.

A body section 14d is provided with a radially outward extending annular flange 271 on which is mounted an upstanding continuous ring of metal 272 like the flexible ring 237 of FIGURE 7 and being braced by a plurality of supports 273 mounted on the flange 271. Mounted on the outer end of the flange 270 is an annular manifold 290, of substantially U-shaped configuration. A continuous flexible metal diaphragm 274 completes the enclosure of the manifold 290.

The interior surface of the ring 272 is formed with a pair of spaced recesses 275 and 277 for the reception of O-rings 281 and 283, respectively. The diaphragm 274 is urged against the O-rings 281 and 283 by a plurality of assemblies 300, each of which includes a bracket 302 secured to the top of the manifold having an opening for the reception of one end of threaded element 304. The opposite end of threaded element 304 is connected by means of pin 305 to link 306 whose opposite end is connected by means of pin 307 to bracket 308. The other end of bracket 308 is secured to manifold 290.

Mounted for pivotal movement with respect to link 306 by means of pin 311 is link 313 whose opposite end is connected by means of pin 315 to rod 317. Bracket 320 having boss 322 for the reception of rod 317 is attached to manifold 290. The other end of rod 317 is attached to block 330, which is urged against diaphragm 274 by a force transmitted through assembly 300 by tightening nut 301, which has received threaded element 304, against bracket 302 and loosening nut 303. The space between O-rings 281 and 283 may be evacuated, if desired, by means of conduit 335.

Another modified form of the present invention is shown in FIGURE 9 in which vessel 12e has a dome 16e provided with an annular flange 350 extending radially outward and an annular flange 352 extending radially inward to form an interior support. An annular plate 354 is secured to the dome 16e and the underside of annular flange 350. Ring 356 is secured to annular flange 350 and annular plate 354.

A body section 14e is provided with a radially outward extending annular flange 370 on which is mounted a continuous flexible diaphragm 372. Formed in diaphragm 372 are continuous grooves 374 and 376 for the reception of O-rings 373 and 375, respectively.

The O-rings 373 and 375 are urged into sealing engagement against continuous flexible diaphragm 378 which is secured to annular plate 354 and ring 356 by means of fluid force which is introduced through inlet 380.

The space between O-rings 373 and 375 may be evacuated by means of conduit 385.

The aforementioned specific embodiments of the present invention are not intended as limitations. The devices described are intended for use in a wide variety of structures, be they circular or non-circular, continuous or non-continuous.

What is claimed is:

A storage tank comprising:
a dome portion having a substantially rigid first flange secured thereto;
a body portion having a substantially rigid second flange secured thereto, said first and second flanges being in confronting relation;
a first continuous flexible member secured to said first flange;
a second continuous flexible member secured to said second flange, said first continuous flexible member and said second continuous flexible member being in confronting relation defining a continuous seam therebetween;
a plurality of spaced blocks, each having a continuous groove therein, secured to the confronting surface of one of said continuous flexible member;
an O-ring disposed in each of said grooves;
a plurality of spaced blocks attached to the confronting surface of the other continuous flexible member and in engaging registration with said O-rings, said continuous flexible members, said blocks and said O-rings extending continuously, without interruption, along the length of said seam;
a first bracket secured to said dome portion and extending over said first continuous flexible member and defining a space between said first bracket and said first continuous flexible member;
a second bracket secured to said body portion and extending under said second continuous flexible member and defining a space between said second bracket and said second continuous flexible member; and,
wedges inserted in said spaces to urge the O-rings and blocks in intimate contact.

References Cited by the Examiner
UNITED STATES PATENTS

| | | | |
|---|---|---|---|
| 2,834,504 | 5/1958 | Annicq | 220—46 |
| 3,043,465 | 7/1962 | Horner | 220—5 |
| 3,066,823 | 12/1962 | Baker | 220—81 |
| 3,144,035 | 8/1964 | Hablanian et al. | 220—46 |
| 3,158,281 | 11/1964 | Adams et al. | 220—46 |

THERON E. CONDON, *Primary Examiner.*

EARLE J. DRUMMOND, *Examiner.*